United States Patent
Kuki et al.

(10) Patent No.: US 10,913,287 B2
(45) Date of Patent: Feb. 9, 2021

(54) INKJET RECORDING APPARATUS, METHOD FOR DRIVING INKJET HEAD, AND METHOD FOR FORMING IMAGE

(71) Applicant: Konica Minolta, Inc., Tokyo (JP)

(72) Inventors: Takakazu Kuki, Tokyo (JP); Toshiyuki Mizutani, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/563,039

(22) PCT Filed: Mar. 29, 2016

(86) PCT No.: PCT/JP2016/060280
§ 371 (c)(1),
(2) Date: Sep. 29, 2017

(87) PCT Pub. No.: WO2016/159031
PCT Pub. Date: Oct. 6, 2016

(65) Prior Publication Data
US 2018/0370247 A1    Dec. 27, 2018

(30) Foreign Application Priority Data
Mar. 31, 2015  (JP) ................................. 2015-074083

(51) Int. Cl.
*B41J 2/195* (2006.01)
*H04N 1/405* (2006.01)
(Continued)

(52) U.S. Cl.
CPC ........... *B41J 2/2139* (2013.01); *B41J 2/0451* (2013.01); *B41J 2/04581* (2013.01);
(Continued)

(58) Field of Classification Search
None
See application file for complete search history.

(56) References Cited

U.S. PATENT DOCUMENTS 8,033,630 B2 * 10/2011 Miyamoto ............. B41J 2/2139
  347/12
8,113,615 B2 * 2/2012 Nishihara ............ B41J 2/04581
  347/10
(Continued)

FOREIGN PATENT DOCUMENTS

| JP | 2001219558 A | 8/2001 |
| JP | 2005125761 A | 5/2005 |

(Continued)

OTHER PUBLICATIONS

International Search Report and Written Opinion for corresponding Application No. PCT/JP2016/060280; dated Jun. 14, 2016.
(Continued)

*Primary Examiner* — Alejandro Valencia
(74) *Attorney, Agent, or Firm* — Cantor Colburn LLP

(57) ABSTRACT

The present invention has a problem of suppressing liquid gathering of an interpolation dot which interpolates a discharge defective nozzle and preventing deterioration of image quality, and the problem is solved by the present invention including: an inkjet head configured to separately discharge a large droplet, a medium droplet, and a small droplet from each of a plurality of nozzles; and a control unit which forms an image in a single-pass system by discharging the medium droplets from the plurality of nozzles respectively, and forms an interpolation dot to interpolate a discharge defective nozzle by discharging a droplet from a different nozzle when the discharge defective nozzle is present, the control unit forming the interpolation dot to interpolate the discharge defective nozzle with the use of the (Continued)

large droplet and forming at least one adjacent dot which is in contact with the interpolation dot with the use of the small droplet.

22 Claims, 16 Drawing Sheets

(51) Int. Cl.
   *B41J 2/21* (2006.01)
   *B41J 2/045* (2006.01)
   *B41J 2/155* (2006.01)
   *B41J 29/393* (2006.01)

(52) U.S. Cl.
   CPC ....... *B41J 2/04588* (2013.01); *B41J 2/04591* (2013.01); *B41J 2/04593* (2013.01); *B41J 2/155* (2013.01); *B41J 2/195* (2013.01); *B41J 2/2121* (2013.01); *B41J 2/2142* (2013.01); *B41J 2/2146* (2013.01); *B41J 29/393* (2013.01); *H04N 1/4057* (2013.01); *B41J 2029/3935* (2013.01); *B41J 2202/06* (2013.01); *B41J 2202/10* (2013.01)

(56) References Cited

U.S. PATENT DOCUMENTS

| | | | |
|---|---|---|---|
| 2006/0125860 A1* | 6/2006 | Arazaki | B41J 2/0451 347/12 |
| 2006/0139394 A1 | 6/2006 | Wada | |
| 2009/0278877 A1 | 11/2009 | Kimura et al. | |
| 2010/0060691 A1 | 3/2010 | Tanase et al. | |
| 2012/0113173 A1 | 5/2012 | Nishihara | |
| 2012/0133695 A1 | 5/2012 | Hakamada | |
| 2015/0070428 A1 | 3/2015 | Sudo et al. | |
| 2015/0258807 A1* | 9/2015 | Sudo | B41J 2/2146 347/9 |

FOREIGN PATENT DOCUMENTS

| | | |
|---|---|---|
| JP | 2006231857 A | 9/2006 |
| JP | 2006341458 A | 12/2006 |
| JP | 2009269351 A | 11/2009 |
| JP | 2010089488 A | 4/2010 |
| JP | 2010094875 A | 4/2010 |
| JP | 2011143731 A | 7/2011 |
| JP | 2014188714 A | 10/2014 |
| JP | 2015054453 A | 3/2015 |

OTHER PUBLICATIONS

Extended European Search Report corresponding to Application No. 16772912.8-1019/3278987 PCT/JP2016060280; dated Oct. 31, 2018.

SIPO First Office Action corresponding to Application No. 201680018615.4; dated Oct. 9, 2018.

JPO Notice of Reasons for Refusal corresponding to Application No. 2017-510069; dated Jun. 25, 2019.

* cited by examiner

FIG. 14A
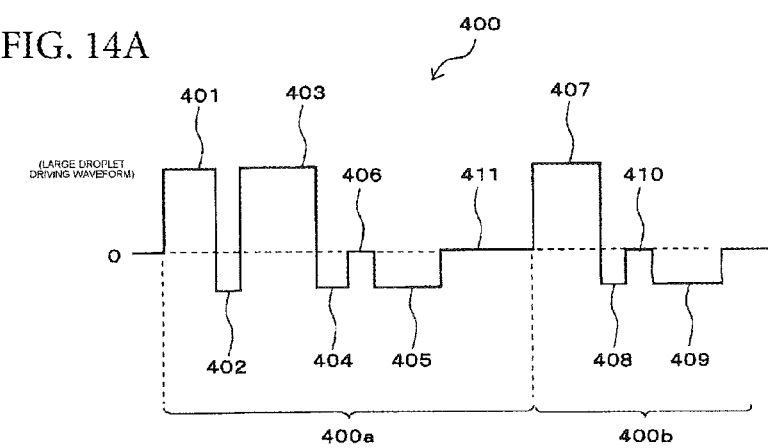
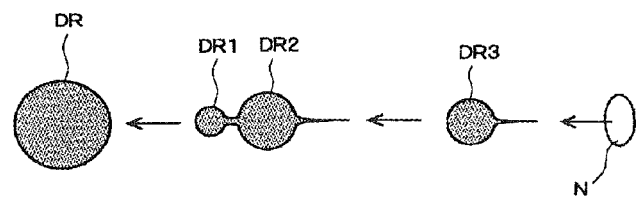
FIG. 14B

FIG. 15A
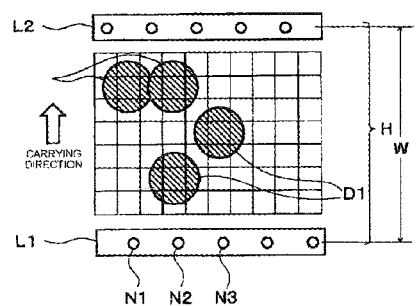
FIG. 15B
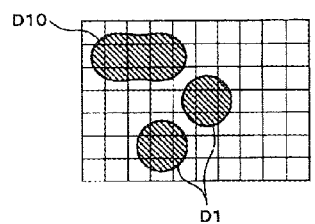
FIG. 15C
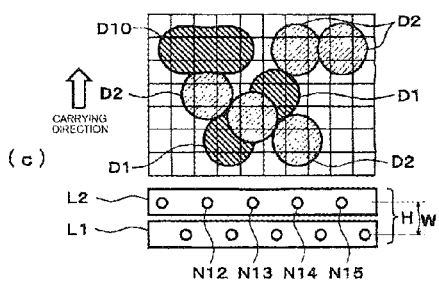
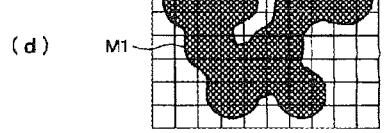
FIG. 15D

INKJET RECORDING APPARATUS, METHOD FOR DRIVING INKJET HEAD, AND METHOD FOR FORMING IMAGE

CROSS REFERENCE TO RELATED APPLICATIONS

This is the U.S. national stage of application No. PCT/JP2016/060280, filed on Mar. 29, 2016. Priority under 35 U.S.C. § 119(a) and 35 U.S.C. § 365(b) is claimed from Japanese Application No. 2015-074083, filed on Mar. 31, 2015, the disclosures of which are also incorporated herein by reference.

TECHNICAL FIELD

The present invention relates to an inkjet recording apparatus, a method for driving an inkjet head, and a method for forming an image, and more particularly to an inject recording apparatus which forms an interpolation dot by discharging droplets from a different nozzles to interpolate a discharge defective nozzle, a method for driving an inkjet head, and a method for forming an image.

BACKGROUND ART

There is an inkjet recording apparatus which forms an image in a predetermined image forming region on a recording medium by a single-pass system with the use of an inkjet head having a plurality of nozzles. When this inkjet recording apparatus has a discharge defect such as clogging or discharge bending in a nozzle, no dot is formed on a recording medium, or a dot is not formed at an appropriate position, and a white streak or the like is produced, which leads to deterioration of image quality. Thus, in conventional examples, a discharge state of droplets from nozzles is periodically inspected and, if a discharge defective nozzle is present, a dot which is supposed to be formed by this discharge defective nozzle is interpolated with a dot formed by a different nozzle.

In conventional examples, as a technology to interpolate a discharge defective nozzle, Patent Documents 1 and 2 disclose that, when a discharge defective nozzle is present, two nozzles on both sides of the discharge defective nozzle are allocated, and spread of droplets discharged from these nozzles on a recording medium is used to perform interpolation recording which makes a white streak or the like less noticeable besides normal recording.

Further, Patent Document 3 discloses that a diameter of a dot formed of a droplet discharged from a nozzle is increased to be larger than a nozzle arrangement interval so that streak unevenness can be made less noticeable.

PRIOR ART DOCUMENTS

Patent Documents

Patent Document 1: JP-A-2006-341458
Patent Document 2: JP-A-2006-231857
Patent Document 3: JP-A-2005-125761

SUMMARY OF THE INVENTION

Problem to be Solved by the Invention

Like the description in Patent Documents 1 and 2, performing the interpolation recording besides the normal recording has a problem that a recording speed is greatly lowered. On the other hand, when a dot diameter of an interpolation dot is set to be large like the description in Patent Document 3, it can be considered that a discharge defective nozzle can be interpolated by large spread of the interpolation dot without lowering the recording speed. However, the present inventor has confirmed that, even if the dot diameter of the interpolation dot is set to be large, a white streak or the like cannot be suppressed in some situations.

This problem will now be described with reference to FIG. 15 and FIG. 16.

FIG. 15 is an enlarged view showing that droplets are discharged from respective nozzles which function normally to form an image in a predetermined region on a recording medium. A latticed pattern in the drawing represents a pixel region.

A head module H has two nozzle rows L1 and L2 in which a plurality of nozzles are aligned. The nozzles are arranged in a zigzag pattern over the nozzle rows L1 and L2. This head module H forms a predetermined image based on image data of a printing target by discharging the droplets from the respective nozzles N in a process of carrying a recording medium P in a carrying direction orthogonal to a nozzle row direction (a left-and-right direction in the drawing). With reference to the recording medium P, the two nozzle rows L1 and L2 move in a main scanning direction. The nozzle rows L1 and L2 are apart from each other to interpose a width W therebetween. Thus, the droplets discharged from the nozzle row L2 arranged on a downstream side of the carrying direction of the recording medium are discharged later than the droplets from the respective nozzles in the nozzle row L1 due to a distance corresponding to this width W.

First, the droplets are discharged from predetermined nozzles N1 to N3 in the nozzle row L1 to form a plurality of dots D1 FIG. 15A. Of these dots, the dots D1 which have impacted in an overlapping manner soon undergo liquid gathering and combine to form a combined dot D10 FIG. 15B. Then, when the recording medium passes immediately below the nozzle row L2, the droplets are discharged from predetermined nozzles N12 to N15 in the nozzle row L2 to further form dots D2 FIG. 15C. Furthermore, all the overlapping dots eventually undergo liquid gathering and combine, and they are fixed to form a predetermined image M1 FIG. 15D.

On the other hand, FIG. 16 is an enlarged view showing that droplets are discharged from respective nozzles except a nozzle having a discharge defect to form the same image as that described above in a predetermined region on the recording medium.

For example, when a discharge defect has occurred in the nozzle N3 in the nozzle row L1, a dot D0 which is supposed to be formed by this nozzle N3 cannot be formed FIG. 16A. Thus, a droplet is discharged from, e.g., a nozzle N14 which can form a dot adjacent to the dot D0 to freshly form an interpolation dot DS anew FIG. 16B. The interpolation dot DS is formed of a large droplet having a larger droplet amount than that of a droplet for normal image formation. Thus, the interpolation dot DS has a dot diameter larger than that of a dot formed of a normal droplet. When this interpolation dot DS spreads on the recording medium, a pixel of the dot D0 is substantially filled, and generation of a white streak or the like can be suppressed.

However, there may occur a liquid gathering phenomenon that the interpolation dot DS immediately after impact is pulled by an adjacent dot D2a which is in contact with the interpolation dot DS in a partially overlapping manner from the same nozzle row L2 and the center of gravity moves. This phenomenon occurs when the interpolation dot DS is discharged later than the adjacent dot D2a. Here, since the adjacent dot D2a is formed of a droplet discharged before a droplet of the interpolation dot DS from the same nozzle N14 as the nozzle which forms the interpolation dot DS, the interpolation dot DS undergoes the liquid gathering toward the adjacent dot D2a. When the liquid gathering of the interpolation dot DS occurs in this manner, the interpolation dot DS cannot be spread to an intended position, and a white streak WL or the like is produced in a resultant image M2 FIG. 16C. Thus, even if a dot diameter of the interpolation dot DS is increased, an intended image M1 in FIG. 15D cannot be formed.

Such a problem occurs no matter what kind of liquid or recording medium is used, but the problem becomes remarkable particularly when viscosity of a liquid forming dots is lowered. Moreover, it becomes remarkable when the recording medium has low ink absorbency like a plastic sheet, for example.

Thus, it is an object of the present invention to provide an inkjet recording apparatus which can suppress liquid gathering of an interpolation dot to interpolate a discharge defective nozzle, and can prevent deterioration of image quality.

Additionally, it is another object of the present invention to provide a method for driving an inkjet head which can suppress liquid gathering of an interpolation dot to interpolate a discharge defective nozzle, and can prevent deterioration of image quality.

Further, it is still another object of the present invention to provide a method for forming an image which can suppress liquid gathering of an interpolation dot to interpolate a discharge defective nozzle, and can prevent deterioration of image quality.

Other objects of the present invention will become clear from the following description.

Means for Solving Problems

The problems will be solved by each of the following inventions.

1. An inkjet recording apparatus comprising: an inkjet head configured to separately discharge a large droplet, a medium droplet, and a small droplet from each of a plurality of nozzles; and a control unit which forms an image in a single-pass system by discharging the medium droplets from the plurality of nozzles respectively, and forms an interpolation dot to interpolate a discharge defective nozzle by discharging a droplet from a different nozzle when the discharge defective nozzle is present, wherein the control unit forms the interpolation dot to interpolate the discharge defective nozzle with the use of the large droplet, and forms at least one adjacent dot which is in contact with the interpolation dot in a partially overlapping manner with the use of the small droplet.

2. The inkjet recording apparatus according to 1, wherein the adjacent dot is a dot which is in contact with the interpolation dot on a side away from a dot which is supposed to be formed by the discharge defective nozzle on a recording medium.

3. The inkjet recording apparatus according to 1 or 2, wherein a dot diameter of the interpolation dot formed of the large droplet on a recording medium is 115% to 250% of a dot diameter formed by the medium droplet.

4. The inkjet recording apparatus according to 1, 2, or 3, wherein a dot diameter of a dot formed of the small droplet on a recording medium is 50% to 85% of the dot diameter formed by the medium droplet.

5. An inkjet recording apparatus according to any one of 1 to 4, wherein the inkjet head comprises a pressure chamber communicating with the nozzles, and a pressure generator which expands or contracts a capacity of the pressure chamber by applying a driving waveform to give a discharge pressure to a liquid in the pressure chamber, and the driving waveform to discharge the large droplet comprises a first expansion pulse which expands the capacity of the pressure chamber and contracts the same after a fixed time, a first contraction pulse which contracts the capacity of the pressure chamber and expands the same after a fixed time, a second expansion pulse which expands the capacity of the pressure chamber and contracts the same after a fixed time, and a second contraction pulse which contracts the capacity of the pressure chamber and expands the same after a fixed time in the mentioned order.

6. The inkjet recording apparatus according to 5, wherein, assuming that ½ of an acoustic resonance period of a pressure wave in the pressure chamber is AL, a pulse width of the first expansion pulse is 0.5 AL or more and 3.5 AL or less.

The inkjet recording apparatus according to 5 or 6, wherein the control unit is configured to change a droplet amount of the large droplet by adjusting the pulse width of the first expansion pulse.

8. The inkjet recording apparatus according to any one of 1 to 7, wherein the control unit enables discharging the small droplet by lowering and using a driving voltage of a medium droplet driving waveform to discharge the medium droplet.

9. A method for driving an inkjet head, comprising: forming an image in a single-pass system on a recording medium by discharging medium droplets from each of a plurality of nozzles configured to separately discharge a large droplet, the medium droplet, and a small droplet; and forming an interpolation dot to interpolate a discharge defective nozzle by discharging a droplet from a different nozzle when the discharge defective nozzle is present, wherein the large droplet is discharged from the different nozzle at the time of forming the interpolation dot, and the small droplet is discharged at the time of forming at least one adjacent dot which is in contact with the interpolation dot in a partially overlapping manner.

10. The method for driving an inkjet head according to 9, wherein the adjacent dot is a dot which is in contact with the interpolation dot on a side away from a dot which is supposed to be formed by the discharge defective nozzle on the recording medium.

11. The method for driving an inkjet head according to 9 or 10, wherein a dot diameter of a dot formed of the large droplet on the recording medium is 115% to 250% of a dot diameter formed by the medium droplet.

12. The method for driving an inkjet head according to 9, 10, or 11, wherein a dot diameter of a dot formed of the small droplet on the recording medium is 50% to 85% of the dot diameter formed by the medium droplet.

13. The method for driving an inkjet head according to any one of 9 to 12, wherein the inkjet head comprises a pressure chamber communicating with the nozzles, and a pressure generator which expands or contracts a capacity of the pressure chamber by applying a driving waveform to give a discharge pressure to a liquid in the pressure chamber, and the driving waveform to discharge the large droplet comprises a first expansion pulse which expands the capacity of the pressure chamber and contracts the same after a fixed time, a first contraction pulse which contracts the capacity of the pressure chamber and expands the same after a fixed time, a second expansion pulse which expands the capacity of the pressure chamber and contracts the same after a fixed time, and a second contraction pulse which contracts the capacity of the pressure chamber and expands the same after a fixed time in the mentioned order.

14. The method for driving an inkjet head according to 13, wherein, assuming that ½ of an acoustic resonance period of a pressure wave in the pressure chamber is AL, a pulse width of the first expansion pulse is 0.5 AL or more and 3.5 AL or less.

15. The method for driving an inkjet head according to 13 or 14,
wherein a droplet amount of the large droplet is changed by adjusting the pulse width of the first expansion pulse.

16. The method for driving an inkjet head according to any one of 9 to 15,
wherein the small droplet is discharged by lowering and using a driving voltage of a medium droplet driving waveform to discharge the medium droplet.

17. A method for forming an image, comprising: forming an image in a single-pass system on a recording medium by discharging medium droplets from each of a plurality of nozzles configured to separately discharge a large droplet, the medium droplet, and a small droplet; and forming an interpolation dot to interpolate a discharge defective nozzle by discharging a droplet from a different nozzle when the discharge defective nozzle is present,
wherein the interpolation dot is constituted of a dot formed of the large droplet, and at least one adjacent dot which is in contact with the interpolation dot in a partially overlapping manner is constituted of a dot formed of the small droplet.

18. The method for forming an image according to 17, wherein the adjacent dot is a dot which is in contact with the interpolation dot on a side away from a dot which is supposed to be formed by the discharge defective nozzle on the recording medium.

19. The method for forming an image according to 17 or 18, wherein a dot diameter of a dot formed of the large droplet on the recording medium is 115% to 250% of a dot diameter formed by the medium droplet.

20. The method for forming an image according to 17, 18, or 19,
wherein a dot diameter of a dot formed of the small droplet on the recording medium is 50% to 85% of the dot diameter formed by the medium droplet.

Effect of the Invention

According to the present invention, it is possible to provide the inkjet recording apparatus which can suppress the liquid gathering of the interpolation dot to interpolate the discharge defective nozzle, and can prevent the deterioration of the image quality.

Furthermore, according to the present invention, it is possible to provide the method for driving an inkjet head which can suppress the liquid gathering of the interpolation dot to interpolate the discharge defective nozzle, and can prevent the deterioration of the image quality.

Moreover, according to the present invention, it is possible to provide a method for forming an image which can suppress the liquid gathering of the interpolation dot to interpolate the discharge defective nozzle, and can prevent the deterioration of the image quality.

BRIEF DESCRIPTION OF DRAWINGS

FIG. 14A is a view showing an example of a large droplet driving waveform, and (b) is a conceptual view of droplets discharged based on the large droplet driving waveform;

FIG. 15 are enlarged views showing that droplets are discharged from respective nozzles which operate normally to form an image in a predetermined region on the recording medium.

DESCRIPTION OF THE PREFERRED EMBODIMENTS

An embodiment according to the present invention will now be described hereinafter with reference to the drawings.
(Method for Forming Image)

A method for forming an image according to the present invention will be first described with reference to FIG. 1 and FIG. 2.

Figure 1:
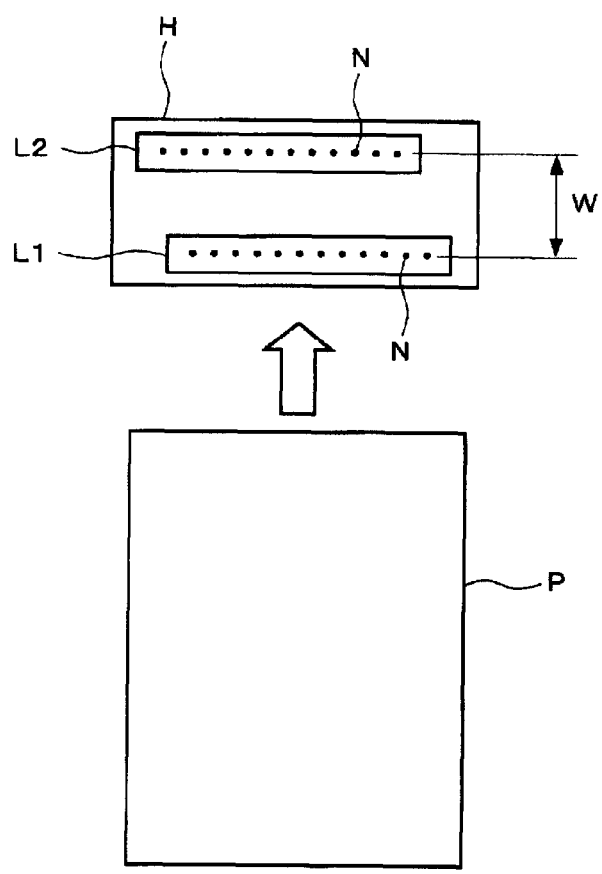
FIG. 1 is a view for explaining a relationship between a head module and a recording medium at the time of forming an image.
Figure 2A:
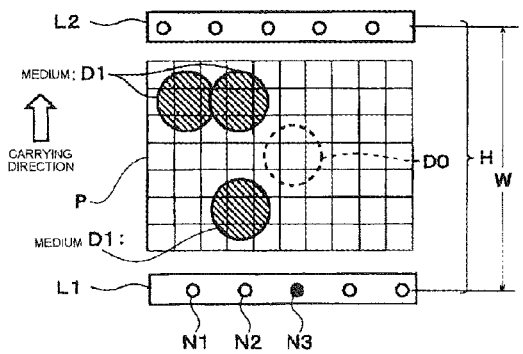
FIG. 2 are enlarged views of a predetermined image forming region formed on the recording medium by discharging droplets from respective nozzles of the head module.
Figure 2B:
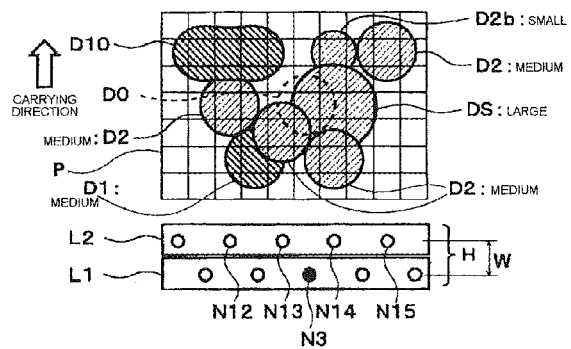
Figure 2C:
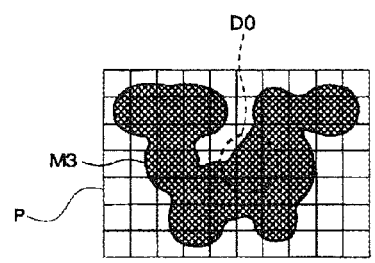

FIG. 1 is a view for explaining a relationship between a head module and a recording medium at the time of forming an image, and FIG. 2 are enlarged views showing that droplets are discharged from respective nozzles in the head module to form an image on the recording medium.

It is to be noted that, in the present invention, a discharge defective nozzles is not restricted to a non-discharge nozzle from which droplets are not discharged at all due to clogging of the nozzle or the like, but it also includes an abnormal discharge nozzle from which droplets are discharged in an abnormal state that the droplets are discharged from the nozzle but the discharged droplets are bent (discharge bending) and do not impact a normal position, for example. In the following description, the non-discharge nozzle will be taken as an example, but the description can be likewise applied to the abnormal discharge nozzle.

As already described, a head module H has two nozzle rows L1 and L2 which have a plurality of nozzles aligned therein respectively and are apart from each other by a width W. As indicated by an outline arrow, in a process of carrying a recording medium P in a carrying direction orthogonal to a nozzle row direction (a left-and-right direction in the drawing), droplets are discharged from the respective nozzles N to form a predetermined image based on image data of a printing target. With reference to the recording medium P, the two nozzle rows L1 and L2 move in a main scanning direction. The respective nozzles N can separately eject a large droplet, a medium droplet, and a small droplet having different droplet amounts, respectively. At the time of normal image formation based on image data of a printing target, of these droplets, the medium droplets are discharged from the nozzles N. The large droplet is a droplet having a larger droplet amount than that of the medium droplet, and the small droplet is a droplet having a smaller droplet amount than that of the medium droplet.

FIG. 2 show a case where the same image as that in FIG. 15 is formed. It is to be noted that each of FIG. 2 and FIG. 15 shows an image formed by the head module in which channels on both sides of a channel which discharges droplets are dummy channels. The dummy channel has no nozzle N formed therein, and does not discharge droplets. The medium droplets which have impacted the recording medium form dots D1. Of these dots, the dots D1 and D1 which are in contact with each other undergo liquid gathering after impact to form a combined dot D10.

Here, if a discharge defect has occurred in a nozzle N3 in the nozzle row L1, a dot D0 which is supposed to be formed by this nozzle N3 is not formed FIG. 2A. It is to be noted that the nozzle N3 in which the discharge defect has occurred is not driven even though the image data requires discharging droplets from the nozzle N3. Further, a large droplet is discharged from a nozzle different from the discharge defective nozzle N3, which is specifically a nozzle N14 in the nozzle row L2 which can form a dot adjacent to a position where the dot D0 is supposed to be formed on the recording medium P, thereby forming an interpolation dot DS adjacent to the position of the dot D0 in a width direction of the recording medium P orthogonal to the main scanning direction (FIG. 2B).

This interpolation dot DS is formed by discharging the large droplet from the nozzle N14, and it is a large dot having a larger dot diameter than that of a dot (a medium dot) formed of a medium droplet. Consequently, the interpolation dot DS can be easily spread to the position of the dot D0, and an interpolation effect can be improved. However, when there is at least one adjacent dot which is formed prior to the interpolation dot DS and is in contact with the interpolation dot DS on the recording medium P, liquid gathering of the interpolation dot DS immediately after the impact undergoes liquid gathering toward this adjacent dot side in conventional examples, and the position of the dot D0 which is supposed to be formed cannot be filled.

A moving amount of the liquid gathering of the dot which is a problem in the conventional examples is dependent on an overlapping amount (an area of an overlapping portion) of two dots which are in contact with each other in a partially overlapping manner on the recording medium P. Thus, in the present invention, attention is focused on the adjacent dot which is in contact with this interpolation dot DS in a partially overlapping manner, and this adjacent dot is formed of a small droplet. That is, as shown in FIG. 2B, when there is an adjacent dot D2b which is formed prior to the interpolation dot DS and is in contact with the interpolation dot DS in the partially overlapping manner on the recording medium P, this adjacent dot D2b is formed of a small dot having a smaller dot diameter than that of a medium dot. That is, a small droplet is discharged from the nozzle N14 which forms the adjacent dot D2b.

Figure 3A:
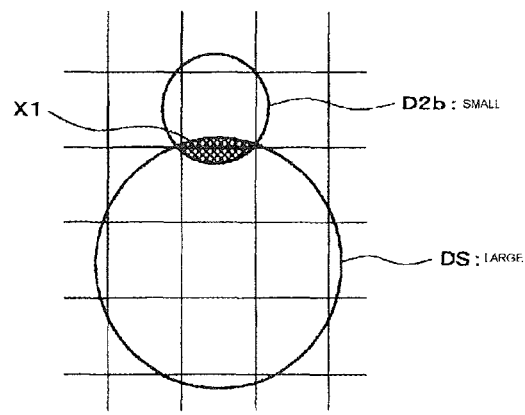
FIG. 3A is a view showing an interpolation dot and a dot which is in contact with the interpolation dot in the present invention.
Figure 3B:
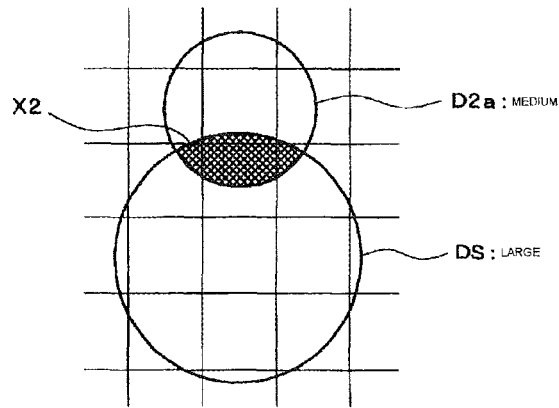
FIG. 3B is a view showing an interpolation dot and a dot which is in contact with the interpolation dot in a conventional example.

Consequently, as shown in FIG. 3A, an area of an overlapping portion X1 of the interpolation dot DS and the adjacent dot D2b is smaller than an area of an overlapping portion X2 of the interpolation dot DS and the adjacent dot D2a which is formed of a medium droplet in a conventional example as shown in FIG. 3B. Here, since the adjacent dot D2b is formed earlier than the interpolation dot DS, there is a possibility that the center of gravity of the interpolation dot DS is drawn toward the adjacent dot D2b side and largely moves, but a moving amount of the interpolation dot DS is suppressed as compared with the conventional example due to the small area of the overlapping portion X1 described above. As a result, the interpolation dot DS can be held at a target position, and the position where the DOT D0 is not formed can be substantially filled with the spread of this interpolation dot DS. Thus, a white streak or the like is not produced in a resultant image M3, and deterioration of image quality can be prevented.

The number of small dots which are in contact with the interpolation dot in a partially overlapping manner is not restricted in particular as long as it is at least one. The specific number of small dots can be appropriately determined based on image data of a printing target in correspondence with the number and positions of dots which are in contact with the interpolation dot in the partially overlapping manner. Since the liquid gathering phenomenon occurs when a subsequently formed dot is drawn to a dot precedently formed on the recording medium P, the small dot formed of a small droplet is at least one dot which is formed prior to the interpolation dot DS and in contact with the interpolation dot DS in the partially overlapping manner.

More specifically, to provide an assured interpolation effect by the interpolation dot DS, the liquid gathering of the interpolation dot DS must be prevented from occurring in a direction to be away from the position of the dot D0 which is supposed to be formed by the discharge defective nozzle. In terms of effectively suppressing the liquid gathering of the interpolation dot DS and securing the interpolation effect, it is preferable for the adjacent dot formed of a small droplet to be an adjacent dot formed prior to the interpolation dot DS on the recording medium P and to be at least one adjacent dot which is in contact with the interpolation dot DS on a side apart from the dot D0 which is supposed to be formed. Thus, in the example shown in FIG. 2, one adjacent dot D2b is formed of a small droplet with respect to the interpolation dot DS.

Figure 4A:
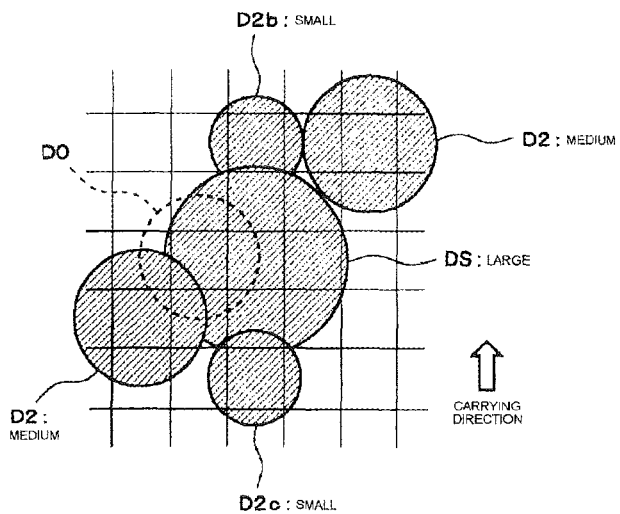
FIG. 4A and FIG. 4B are views for explaining a relationship between the interpolation dot and adjacent dots.

On the other hand, as shown in FIG. 4A, it is also preferable for an adjacent dot D2c which is formed later than the interpolation dot DS by the nozzle N14 and in contact with the interpolation dot DS to be formed of a small droplet. Since this adjacent dot D2c is formed later than the interpolation dot DS, liquid gathering of this dot toward the interpolation dot DS side is apt to occur immediately after the impact. When this adjacent dot D2c is formed of a small droplet, the adjacent dot D2c can be prevented from moving toward the interpolation dot DS side from its original dot position. Consequently, the deterioration of image quality can be further suppressed.

Figure 4B:
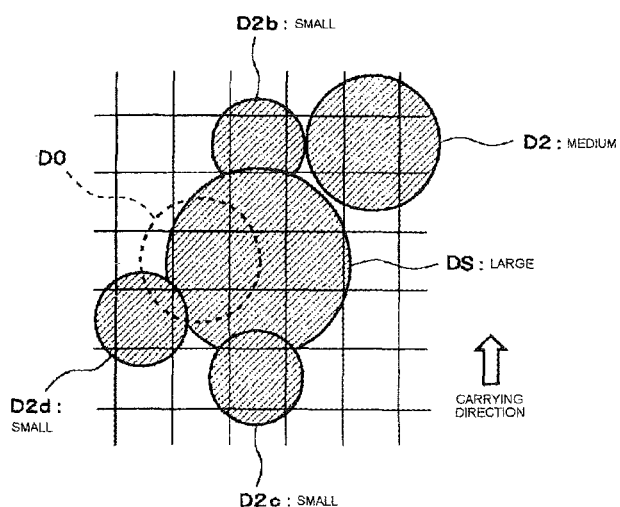

Further, as shown in FIG. 4B, it is also preferable for an adjacent dot D2d which is formed later than the interpolation dot DS by the nozzle N13 and in contact with the interpolation dot DS to be formed of a small droplet. Like the adjacent dot D2c, liquid gathering of this adjacent dot D2d toward the interpolation dot DS side is also apt to occur immediately after the impact. When this adjacent dot D2d is formed of a small droplet, the adjacent dot D2d can be prevented from moving toward the interpolation dot DS side from its original dot position. Consequently, the deterioration of image quality can be further suppressed.

Although the interpolation dot DS formed of a large droplet could be larger than a dot formed of a medium droplet, it is preferable for a specific dot diameter of the interpolation dot DS to be 115% to 250% of a dot diameter formed by the medium droplet. When the dot diameter of the interpolation dot DS is set to fall within this range, the discharge defective nozzle can be interpolated to assuredly suppress a white streak or the like, and graininess of image quality can be maintained.

Furthermore, although the small dot formed of a small droplet could be smaller than a dot formed of a medium droplet, it is preferable for a specific dot diameter of the small dot to be 50% to 85% of a dot diameter formed by the medium droplet. When the dot diameter of the small dot is set to fall within this range, visibility of the dot can be maintained, and the liquid gathering can be avoided to provide gradation properties.

It is to be noted that the dot diameter represents a diameter of a dot if the dot has a circular shape. When the dot does not have circular shape, the dot diameter represents a diameter of a circle when the dot shape is converted into this circle having the same area.

It is preferable to appropriately adjust the droplet amount depending on a type of the recording medium P. For example, when the recording medium P is a medium having low surface energy like cast coated paper or the like, a dot diameter to be formed is reduced even though the droplet amount is the same as above. In this case, it is preferable to increase the droplet amount so that a desired dot diameter can be provided on the recording medium P.

Contrarily, when the recording medium P is a type which absorbs droplets by capillary force like high-quality paper or fabric, a dot can be formed with a small droplet amount. In this case, it is preferable to reduce the droplet amount for a decrease in printing cost, prevention of strike-through of droplets, and others.

Actual image formation is not restricted to an image shown in FIG. 2, and various two-dimensional images based on image data of a printing target are formed by relative movement of the inkjet head and the recording medium based on a single-pass system. The present invention can be applied to a case where the interpolation dot DS to interpolate the discharge defective nozzle is formed as described above at the time of forming the various two-dimensional images. That is, when the interpolation dot DS is formed of a large droplet and at least one adjacent dot which is in contact with this interpolation dot DS in a partially overlapping manner is formed of a small droplet, the liquid gathering of the interpolation dot DS can be suppressed, and a decrease in image quality can be avoided.

(Inkjet Recording Apparatus, Method for Driving Inkjet Head)

An example of an inkjet recording apparatus which is preferably used when the above-described method for forming an image is implemented will now be described with reference to FIG. 5 and FIG. 6.

Figure 5:
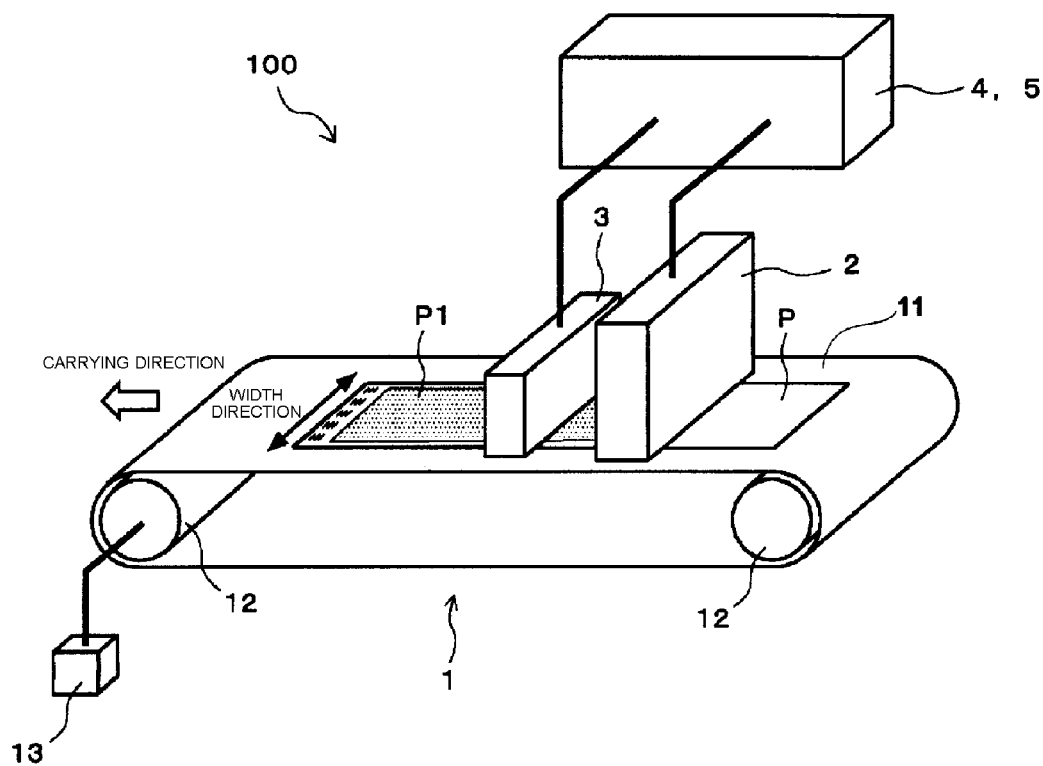
FIG. 5 is a schematic block diagram showing an example of an inkjet recording apparatus.
Figure 6:
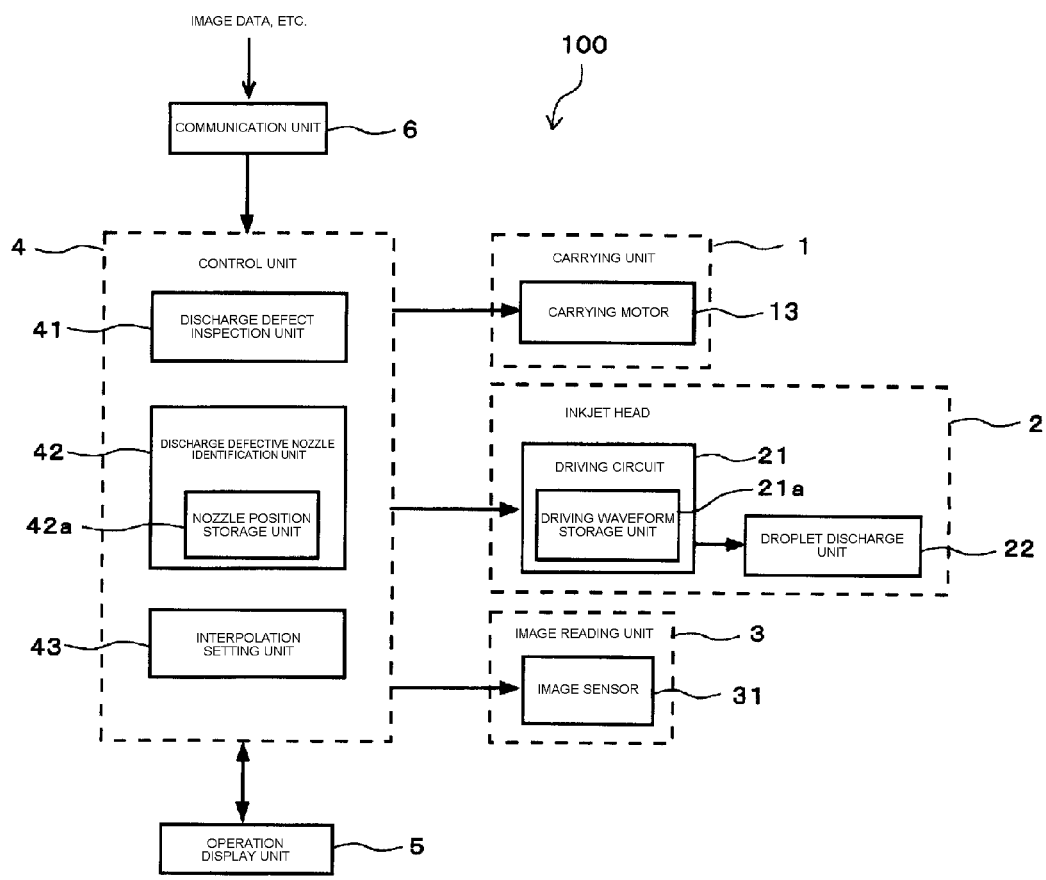
FIG. 6 is a block diagram for explaining an inner structure of the inkjet recording apparatus shown in FIG. 5.

FIG. 5 is a schematic block diagram showing an example of an inkjet recording apparatus, and FIG. 6 is a block diagram for explaining an inner structure of the inkjet recording apparatus shown in FIG. 5.

This inkjet recording apparatus 100 includes a carrying unit 1, an inkjet head 2, an image reading unit 3, a control unit 4, an operation display unit 5, and others.

As shown in FIG. 5, the carrying unit 1 includes a carrying belt 11, a pair of carrying rollers 12 around which the carrying belt 11 is wound, a carrying motor 13 which allows the carrying rollers 12 to undergo revolving motion, and others. The recording medium P placed on the carrying belt 11 is carried in one direction indicated by an outline arrow in FIG. 5 by a rotating operation of the carrying motor 13. It is to be noted that the recording medium P is not restricted to a sheet type cut into a predetermined size, and it may be a long type. Furthermore, the carrying unit 1 may be configured to rotate a non-illustrated cylindrical carrying drum so that the recording medium P arranged on a surface of the carrying drum is moved in a rotating direction.

The inkjet head 2 has a driving circuit 21 and a droplet discharge unit 22 as shown in FIG. 6. The driving circuit 21 includes a driving waveform storage unit 21a which stores driving waveform data to discharge droplets from the respective nozzles in the inkjet head 2. Driving waveforms stored in this driving waveform storage unit 21a includes a medium droplet driving waveform used at the time of performing normal image formation based on image data of a printing target as well as a large droplet driving waveform used at the time of forming the interpolation dot. Moreover, the driving circuit 21 output any driving waveform in the driving waveforms stored in the driving waveform storage unit 21a to the droplet discharge unit 22 at predetermined timing based on a control signal from the control unit 4.

Although the droplet discharge unit 22 will be described later in detail, it includes a pressure chamber which communicates with the nozzles and stores a liquid (an ink) and a pressure generator which imparts a pressure to the liquid in the pressure chamber. In the droplet discharge unit 22, the pressure generator operates by application of any of the driving waveforms output from the driving circuit 21 and applies a pressure for discharge to the liquid in the pressure chamber. Consequently, droplets are discharged from the respective nozzles aligned on a nozzle surface facing the recording medium P at predetermined timing.

Figure 7:
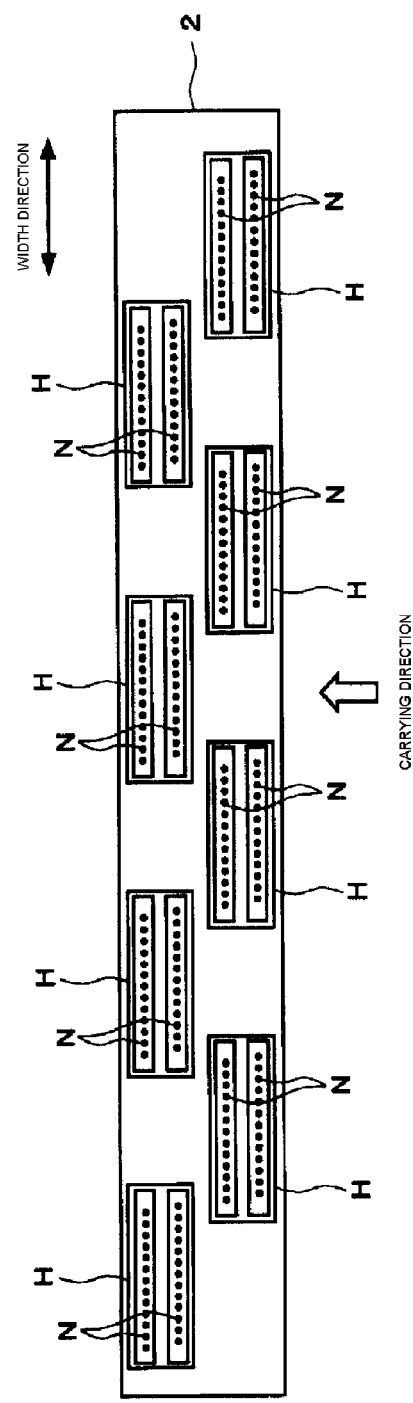
FIG. 7 is a bottom view showing a facing surface (a nozzle surface) in an inkjet head to the recording medium.

FIG. 7 is a bottom view showing a facing surface (the nozzle surface) in the inkjet head relative to the recording medium. As shown in FIG. 7, this inkjet head 2 is constituted of a line head in which a plurality of nozzles are aligned so that droplets can be discharged along a width direction of the recording medium P orthogonal to the carrying direction of the recording medium P. The plurality of nozzles can be provided so that they can independently discharge inks of a plurality of colors, e.g., Y (yellow), M (magenta), C (cyan), K (black), and the like.

In this inkjet recording apparatus 100, the recording medium P is carried in one direction to the inkjet head 2 fixed above the recording medium P. The inkjet recording apparatus 100 discharges droplets from the nozzles in the inkjet head 2 in a carrying process of this recording medium P to form an image by the single-pass system. This inkjet head 2 can separately discharge a large droplet, a medium droplet, and a small droplet from the respective nozzles. In formation of a normal image based on image data of a printing target, the medium droplets are discharged from the nozzles.

In this inkjet head 2, a plurality of head modules H each having the plurality of nozzles N aligned therein are aligned in a zigzag pattern along the width direction. Each head module H has the same structure as that shown in FIG. 1. The nozzles N arranged at end portions in the width direction of each had module H are arranged so that their positions in the width direction overlap positions of the nozzles N in the width direction of another head module H. Such an arrangement enables continuously discharging the liquid in the width direction as a whole.

As shown in FIG. 6, the image reading unit 3 faces the recording medium P, and has an image sensor 31 arranged on a downstream side of the inkjet head 2 along the carrying direction. For example, this image sensor 31 is a line sensor in which a plurality of CCDs (Charge Coupled Devices) or CMOS sensors as imaging elements using photoelectric conversion are aligned along the width direction of the recording medium P so that a one-dimensional image can be acquired. When the inkjet head 2 can form a color image with inks of the plurality of colors YMCK, it is preferable to enable acquiring the image in accordance with each of a plurality of wavelength components, e.g., three wavelengths R (red), G (green), and B (blue).

The control unit 4 outputs control signals to the carrying unit 1, the inkjet head 2, and the image reading unit 3 in accordance with a predetermined program, and executes various kinds of processing concerning image formation. This control unit 4 includes a discharge defect inspection unit 41, a discharge defective nozzle identification unit 42, an interpolation setting unit 43, and others.

The discharge defect inspection unit 41 performs processing to inspect whether any one of the plurality of nozzles N in the inkjet head 2 is a discharge defective nozzle by controlling the carrying unit 1, the inkjet head 2, and the image reading unit 3 in accordance with a predetermined program. Although particulars of the specific processing contents will be described later, the processing is performed by controlling driving of the inkjet head 2 to form a test image in a predetermined region on the recording medium P and reading this test image by the image sensor 31 in the image reading unit 3.

When a discharge defective nozzle has been determined to be present as a result of the inspection conducted by the discharge defect inspection unit 41, the discharge defective nozzle identification unit 42 performs processing to identify which one is the discharge defective nozzle by controlling the carrying unit 1, the inkjet head 2, and the image reading unit 3 in accordance with a predetermined program. Although particulars of the specific processing contents will be described later, the processing is performed by controlling driving of the inkjet head 2 to form a predetermined nozzle identification chart on the recording medium P and reading this nozzle identification chart by the image sensor 31 in the image reading unit 3.

This discharge defective nozzle identification unit 42 includes a nozzle position storage unit 42a which stores a position of the identified discharge defective nozzle.

The interpolation setting unit 43 performs setting processing to interpolate the discharge defective nozzle identified by the discharge defective nozzle identification unit 42. Specifically, even if image data of a printing target requires the discharge defective nozzle to discharge a droplet, the discharge defective nozzle is not driven, and a large droplet is discharged from a nozzle adjacent to the discharge defective nozzle based on the image data of the printing target, thereby forming an interpolation dot. Further, when there is an adjacent dot which is in contact with this interpolation dot in a partially overlapping manner, data of a driving control program for the inkjet head 2 is set so that this adjacent dot can be a small dot formed of a small droplet.

The operation display unit 5 includes a display panel which performs display corresponding to a control signal from the control unit 4, an operation key which accepts an input operation from the outside, and others. Although the display panel is not restricted in particular, it is, e.g., a liquid crystal panel (LCD). Furthermore, it may be configured to perform both display and acceptance of operations when it includes, in place of the operation key or together with the operation key, a touch sensor laminated and arranged on a panel of the LCD and uses it as a touch panel.

Moreover, the control unit 4 is connected with an electronic computer or a storage device such as an external printer server or a personal computer (PC) through a communication unit 6, and transmits and receives various kinds of print jobs, image data of a printing target, and others.

A description will now be given as to an example of processing for the inspection and the interpolation of a discharge defective nozzle (which will be referred to as interpolation setting processing hereinafter) in the inkjet recording apparatus 100.

The interpolation setting processing includes processing to inspect whether a discharge defect nozzle is present in the inkjet head 2 executed by the discharge defect inspection unit 41 of the control unit 4, processing to identify the discharge defective nozzle executed by the discharge defective nozzle identification unit 42, and processing to interpolate the discharge defective nozzle executed by the interpolation setting unit 43.

This interpolation setting processing is automatically executed by the control unit 4 at predetermined intervals, e.g., every time a single unit or a plurality of units of images are formed on the recording medium P, or in accordance with each recording medium P or a plurality of recording mediums P when the recording medium P is a sheet type.

Figure 8:
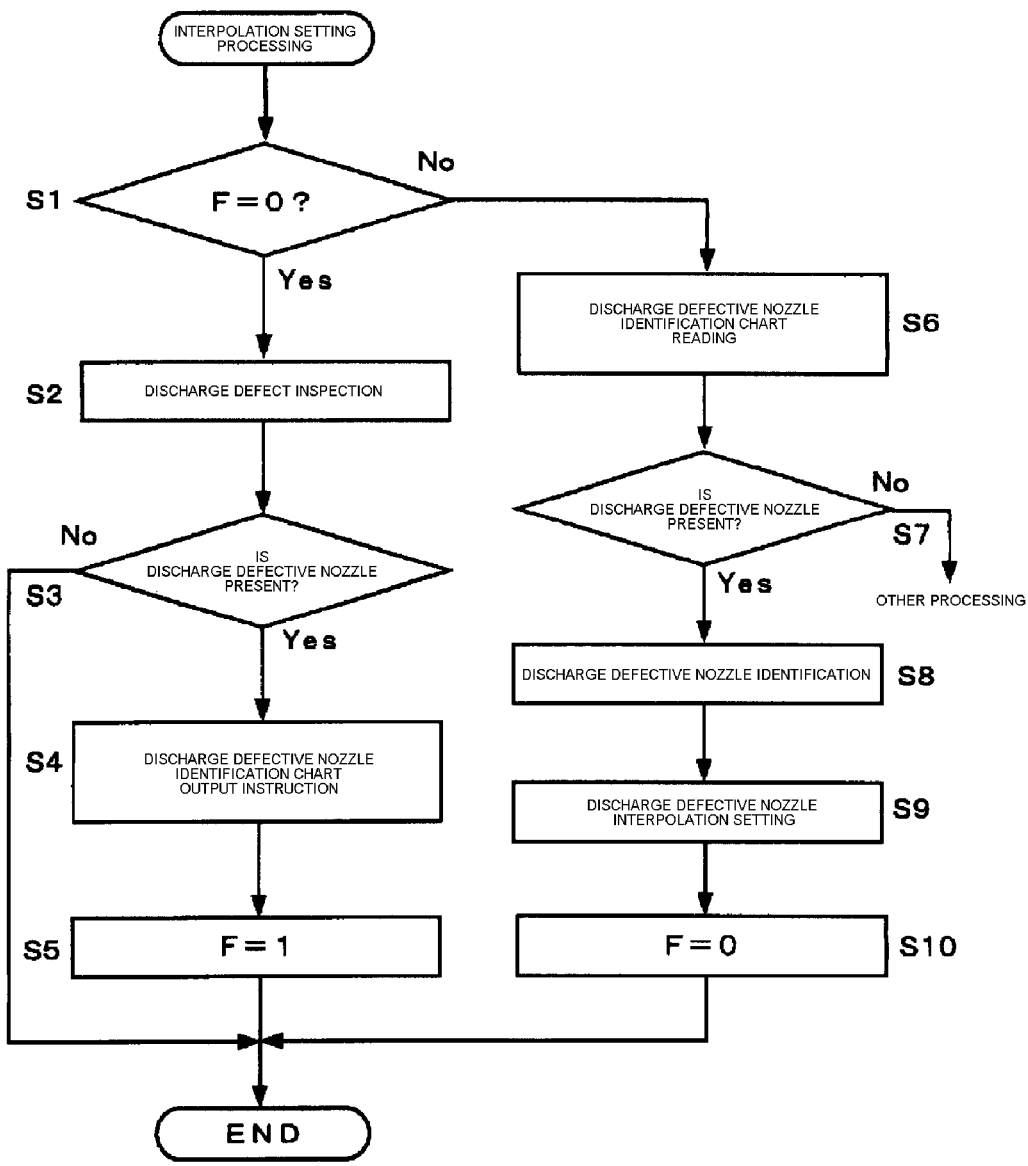
FIG. 8 is a flowchart showing a procedure of interpolation setting processing performed by a control unit.
Figure 9:
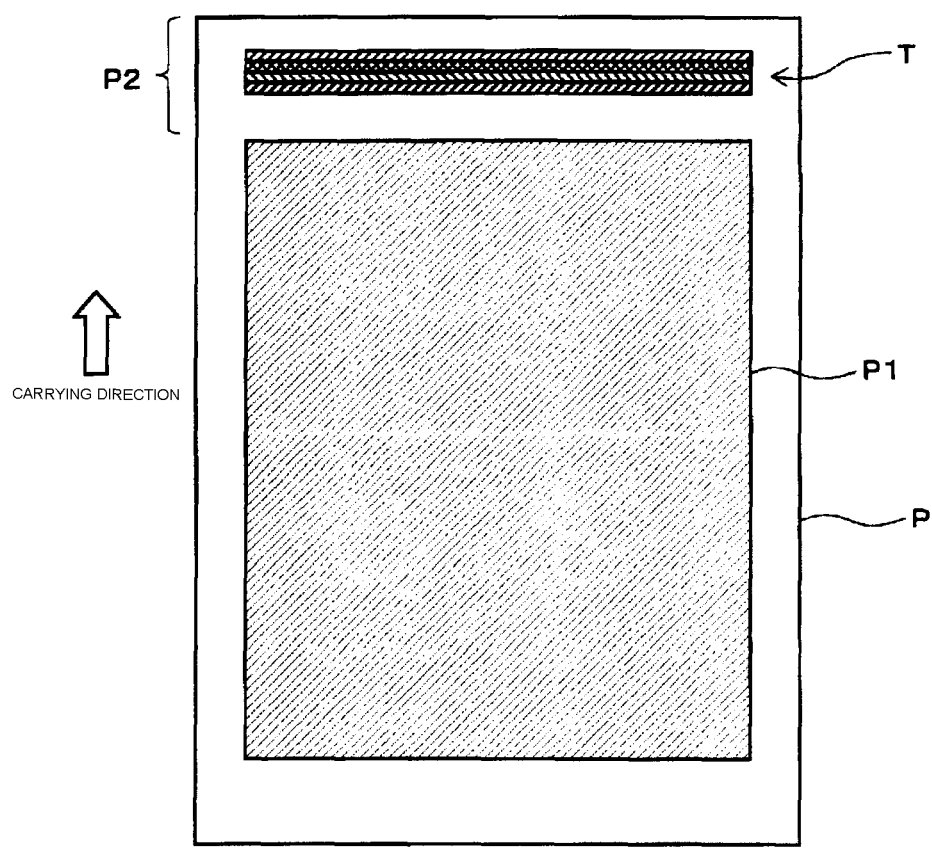
FIG. 9 is a view showing an example of a formed image including a test image concerning a discharge defect inspection conducted by the interpolation setting processing.

FIG. 8 is a flowchart showing a procedure of the interpolation setting processing executed by the control unit 4, and FIG. 9 is a view showing an example of a formed image including a test image concerning the discharge defect inspection executed in the interpolation setting processing.

When the interpolation setting processing begins, the control unit 4 confirms a flag F concerning the interpolation setting processing, and determines whether F=0 is achieved (a step S1). When F=0, namely, when the discharge defect inspection has not been performed until the previous processing, or when the interpolation setting of the identified discharge defective nozzle has been already configured (YES at the step S1), the discharge defect inspection unit 41 conducts the discharge defect inspection with the use of a test image acquired this time (a step S2).

As shown in FIG. 9, the test image T to inspect whether the discharge defective nozzle is present is formed in a margin region P2 outside an image forming region P1 (a region where an image based on image data of a printing target is formed) set on the recording medium P. Here, the margin region is one which is present on a head side of the image forming region P1 of the sheet type recording medium P along the carrying direction, but it may be a margin region on a tail side of the same. When the recording medium P is a long type, the test image T may be formed on the head side or the tail side of the image formed based on the image data of the printing target.

Data of this test image T is stored in, e.g., the discharge defect inspection unit 41. Prior to formation of a normal image based on the image data of the printing target in the image forming region P1, the discharge defect inspection unit 41 reads out the data of this test image T and controls driving of the inkjet head 2 to discharge droplets from the respective nozzles N in order, thereby forming the test image T in a strip-like shape in the width direction.

A specific structure of the test image T does not matter in particular as long as the image is formed by driving and controlling the inkjet head 2 to discharge droplets from all the nozzles N. For example, a halftone image or the like formed to provide predetermined concentration (gradation) can be used.

The test image T is read by the image sensor 31 when it passes under the image reading unit 3 by carriage of the recording medium P. When a discharge defective nozzle is present, since no droplet is discharged from the discharge defective nozzle or the droplet does not impact a normal position, a white streak or the like is produced, and image concentration changes from predetermined concentration. The discharge defect inspection unit 41 compares a concentration value of the test image T read by the image sensor 31 with a predetermined concentration value (a concentration value of a normal image with no discharge defect) to determine whether the discharge defective nozzle is present (a step S3).

When no discharge defective nozzle has been determined to be present (NO at the step S3), the interpolation setting processing by the control unit 4 is finished. When the discharge defective nozzle has been determined to be present (YES at the step S3), the control unit 4 instructs to output a discharge defective nozzle identification chart for identification of the discharge defective nozzle by using the discharge defective nozzle identification unit 42 (a step S4). Then, the control unit 4 sets the flag F to F=1 (a step S5), and temporarily terminates the interpolation setting processing.

On the other hand, when F=0 has not been determined in the determination processing of the flag F at the step S1 (NO at the step S1), the control unit 4 determines that processing to read the discharge defective nozzle identification chart should be performed, and reads the discharge defective nozzle identification chart formed at the step S4 by using the image sensor 31 (a step S6).

Data of the discharge defective nozzle identification chart is stored in, e.g., the discharge defective nozzle identification unit 42. The discharge defective nozzle identification unit 42 performs this data reading and discharge of droplets from the respective nozzles N onto the recording medium P to form the discharge defective nozzle identification chart. Although a specific chart image is not restricted in particular, a well-known charge image to identify a discharge defective nozzle can be appropriately used. For example, it is possible to use a chart image in which, e.g., a ladder-like or lattice-like pattern is formed.

The discharge defective nozzle identification unit 42 analyzes imaging data of the discharge defective nozzle identification chart read by the image sensor 31, and determines whether the discharge defective nozzle is actually present (a step S7). When the discharge defective nozzle has been determined not to be present (NO at the step S7), it corresponds to any other abnormal state, and the processing of the control unit 4 advances to any other processing corresponding to the abnormality.

When the discharge defective nozzle has been determined to be present (YES at the step S7), the discharge defective nozzle identification unit 42 identifies a dot missing position caused due to the discharge defective nozzle, and identifies the discharge defective nozzle in the inkjet head 2 from this dot missing position. Data concerning the identified discharge defective nozzle (e.g., a nozzle number) is stored in the nozzle position storage unit 42a (a step S8). Then, the control unit 4 configures a setting to interpolate this discharge defective nozzle by the interpolation setting unit 43 (a step S9).

As the setting to interpolate the discharge defective nozzle, when there is image data which requires the discharge defective nozzle to perform discharge, as shown in FIG. 2, a large droplet is discharged from any nozzle (the nozzle N14 in FIG. 2) adjacent to the discharge defective nozzle N3 to form the interpolation dot DS without discharging a droplet from the discharge defective nozzle. Furthermore, when data of the driving control program is reset and an adjacent dot which is in contact with the interpolation dot DS in the partially overlapping manner is formed, a small droplet is discharged from a nozzle (the nozzle N14 in FIG. 2) forming this adjacent dot. Then, the control unit 14 restores the flag F to F=0 (a step S10), and terminates the interpolation setting processing.

The setting of the data of the driving control program by the interpolation setting unit 43 can be specifically performed as follows, for example. When there is data which requires the discharge defective nozzle N3 shown in FIG. 2 to discharge a droplet, the control unit 4 first prevents the discharge defective nozzle N3 from discharging a droplet. Moreover, the interpolation dot DS is formed by using the nozzle N14 selected as an interpolation nozzle. That is, a driving waveform output from the driving circuit 21 to the droplet discharge unit 22 is switched to a large droplet driving waveform. The driving circuit 21 applies the switched large droplet driving waveform to the pressure generator of the droplet discharge unit 22 corresponding to the selected nozzle N14. Consequently, a large droplet is discharged from the nozzle N14 at timing of forming the interpolation dot DS.

Additionally, when there is an adjacent dot which is in contact with the interpolation dot DS in the partially overlapping manner as a result of analyzing the image data of the printing target, the interpolation setting unit 43 switches the driving waveform output to the droplet discharge unit 22 from the driving circuit 21 to a small droplet driving waveform for a nozzle which forms the adjacent dot. The driving circuit 21 applies the switched small droplet driving waveform to the pressure generator of the droplet discharge unit 22 corresponding to the nozzle which forms the adjacent dot. Consequently, a small droplet is discharged from this nozzle at timing of forming the adjacent dot which is in contact with the interpolation dot DS in the partially overlapping manner.

A specific example of the droplet discharge unit 22 in the inkjet head 2 will now be described.

Figure 10A:
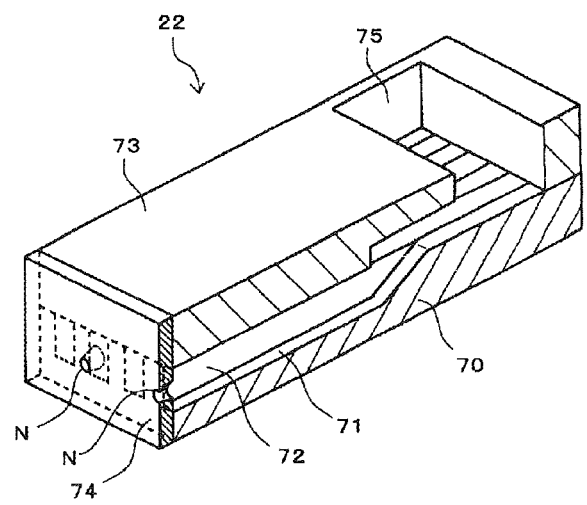
FIG. 10A is a perspective view showing one side surface of a droplet discharge unit as a cross section.
Figure 10B:
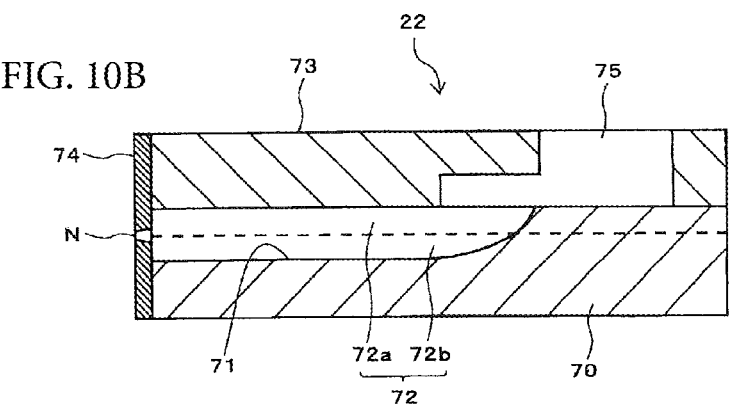
FIG. 10B is a cross-sectional view of the droplet discharge unit.

FIG. 10A is a perspective view showing one side surface of the droplet discharge unit 22 as a cross section, and FIG. 10B is a cross-sectional view of the droplet discharge unit 22. It is to be noted that a portion which constitutes one nozzle row alone is shown.

In the droplet discharge unit 22, a plurality of micro-groove-like channels 71 and partition walls 72 are alternately juxtaposed on a channel substrate 70. A cover substrate 73 is provided on an upper surface of the channel substrate 70, and closes upper sides of all the channels 71 in the drawing. A nozzle plate 74 is bonded to end surfaces of the channel substrate 70 and the cover substrate 73. One end of each channel 71 communicates with the outside through a nozzle N formed in this nozzle plate 74.

The other end of each channel 71 is formed to gradually become a shallow groove on the channel substrate 70. A common flow path 75 communicating with the other end of each channel 71 is formed in the cover substrate 73. A liquid is supplied to the common flow path 75 through a non-illustrated supply tube or the like.

The partition wall 72 is formed of a piezoelectric element such as PZT which is an electromechanical converter. As this partition wall 72, an example formed of the piezoelectric element having an upper wall portion 72a and a lower wall portion 72b polarized in opposite directions is shown. However, a portion formed of the piezoelectric element may be, e.g., the upper wall portion 72a alone. Since the partition walls 72 and the channels 71 are alternately juxtaposed, one partition wall 72 is shared by the channels 71 and 71 provided on both sides thereof.

A driving electrode (which is not shown in FIG. 10) is formed on an inner surface of each channel 71 from wall surfaces of both the partition walls 72 and 72 to a bottom surface. When a driving waveform including an expansion pulse and a contraction pulse is applied from the driving circuit 21 to the two driving electrodes arranged to sandwich the partition wall 72 therebetween, the partition wall 72 undergoes shear deformation with a bonding plane of the upper wall portion 72a and the lower wall portion 72b at the center. When the two partition walls 72 and 72 adjacent to each other undergo the shear deformation in opposite directions, a capacity of the channel 71 sandwiched between the partition walls 72 and 72 expands or contracts, and a pressure wave is generated inside. Consequently, a pressure for discharge is given to the liquid in the channel 71.

This droplet discharge unit 22 is a shear-mode type head which discharges the liquid in the channel 71 from the nozzle N when the partition walls 72 undergo the shear deformation, and it is a preferable mode in the present invention. The shear-mode type head can efficiently discharge droplets by using a later-described rectangular wave as the driving waveform.

It is to be noted that each channel 71 surrounded by the channel substrate 70, the partition walls 72, the cover substrate 73, and the nozzle plate 74 constitutes a pressure chamber in the present invention, and each partition wall 72 and the driving electrode on the surface thereof constitute the pressure generator in the present invention.

Figure 11A:
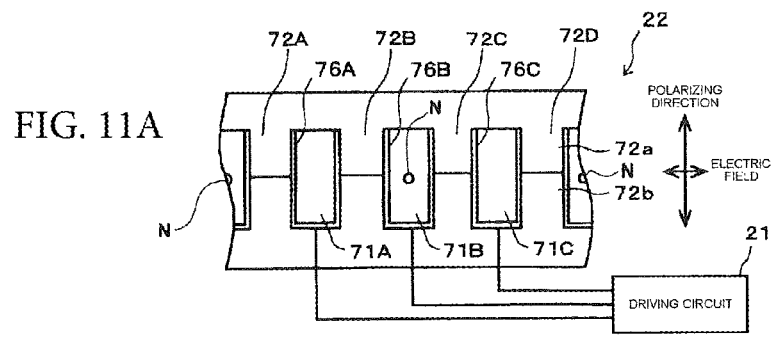
FIG. 11A to FIG. 11C are views for explaining a droplet discharge operation of channels in the droplet discharge unit.

FIG. 11 is a view for explaining a droplet discharge operation of the droplet discharge unit 22. FIG. 11 shows a part of a cross section provided by cutting the droplet discharge unit 22 depicted in FIG. 10 along a direction orthogonal to a length direction of the channel 71. Here, an operation when a droplet is discharged from a central channel 71B will be described.

Figure 11B:
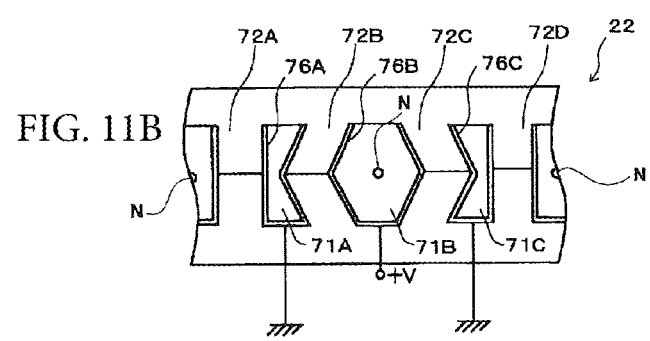

Channels 71A and 71C sandwiching the channel 71B from which the droplet is to be discharged therebetween are dummy channels. Nozzles N are not formed in the dummy channels 71A and 71C, and droplets are not discharged from these channels. First, from a neutral state of partition walls 72B and 72C shown in FIG. 11A, driving electrodes 76A and 76C are grounded and an expansion pulse is applied to a driving electrode 76B as shown in FIG. 11B. Then, the partition walls 72B and 72C deform to bend toward the outside, and a capacity of the channel 71B sandwiched between the partition walls 72B and 72C increases. Consequently, a negative pressure is generated in the channel 71B, and the liquid flows into the channel 71B from the common flow path 75. Then, when the application of the expansion pulse is terminated, the channel 71B contracts from the expanded state and returns to the original neutral state shown in FIG. 11A.

Figure 11C:
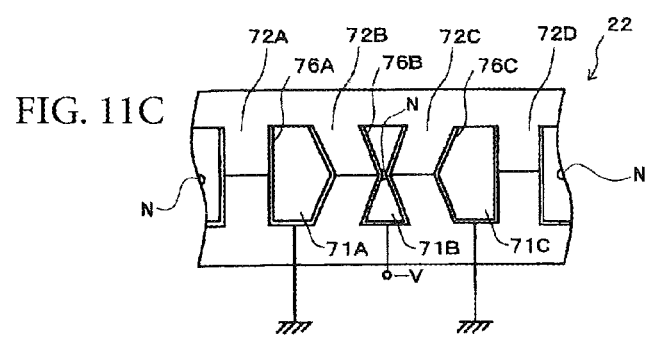

Subsequently, as shown in FIG. 11C, the driving electrodes 76A and 76C are grounded, and a contraction pulse is applied to the driving electrode 76B. Then, the partition walls 72B and 72C deform to bend toward the inside, and the capacity of the channel 71B sandwiched between the partition walls 72B and 72C decreases. Consequently, a positive pressure is generated in the channel 71B. When the pressure increases to enable discharging the liquid in the channel 71B through the nozzle N, the droplet is discharged from the nozzle N. Then, when the application of the contraction pulse is terminated, the channel 71B expands from the contracted state and returns the original neutral state shown in FIG. 11A.

A description will now be given as to embodiments of the large droplet driving waveform, the medium droplet driving waveform, and the small droplet driving waveform used at the time of forming an image.

Figure 12A:
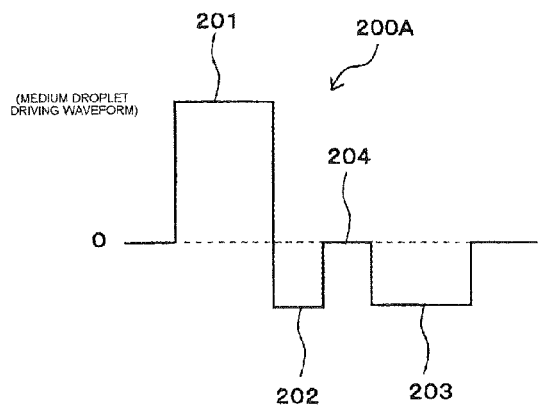
FIG. 12A and FIG. 12B are views each showing an example of a medium droplet driving waveform.

First, an example of the medium droplet driving waveform used in normal image formation based on image data of a printing target in the present invention is shown in FIGS. 12(a) and (b).

A medium droplet driving waveform 200A shown in FIG. 12A is a driving waveform having, in a one-pixel period, an expansion pulse 201 which expands the capacity of the channel 71 and contracts (restores) the same after a fixed time, a first contraction pulse 202 which contracts the capacity of the channel 71 and expands (restores) the same after a fixed time, and a second contraction pulse 203 which contracts the capacity of the channel 71 and expands (restores) the same after a fixed time in the mentioned order.

The expansion pulse 201 is a pulse which rises from a reference potential and falls to the reference potential after a fixed time. Each of the first contraction pulse 202 and the second contraction pulse 203 is a pulse which falls from the reference potential and rises to the reference potential after a fixed time. The expansion pulse 201 and the first contraction pulses 202 are continuous without interposing a pause period therebetween. A pause period 204 during which the reference potential is maintained for a fixed period is provided between the first contraction pulse 202 and the second contraction pulse 203.

Although widths of the respective pulses 201, 202, and 203 and the pause period 204 are not restricted in particular, when the channel 71 has a height 200 μm×a width 65 μm×a length 1.8 mm and a diameter of the nozzle N is 22 μm, setting a pulse width of the expansion pulse 201 to 1 AL, a pulse width of the first contraction pulse 202 to 0.5 AL, a pulse width of the second contraction pulse 203 to 1 AL, and a width of the pause period 204 to 0.5 AL enables discharge a droplet of 3.8 pl from the nozzle N. For example, when the recording medium is a coated paper sheet, a dot diameter of a medium dot formed of this droplet of 3.8 pl is approximately 60 μm.

It is to be noted that AL is an abbreviation of Acoustic Length, and it is ½ of an acoustic resonance period of the pressure wave in the channel 71. When a flying speed of a droplet discharged at the time of applying a driving signal of a rectangular wave to the driving electrode is measured and a pulse width of the rectangular wave is changed while fixing a voltage value of the rectangular wave, AL is obtained as a pulse width which maximizes the flying speed of the droplet. Assuming that a reference voltage is 0% and a peak value voltage is 100%, the pulse width is defined as a time between 10% of rising from the reference voltage and 10% of falling from the peak value voltage.

Figure 12B:
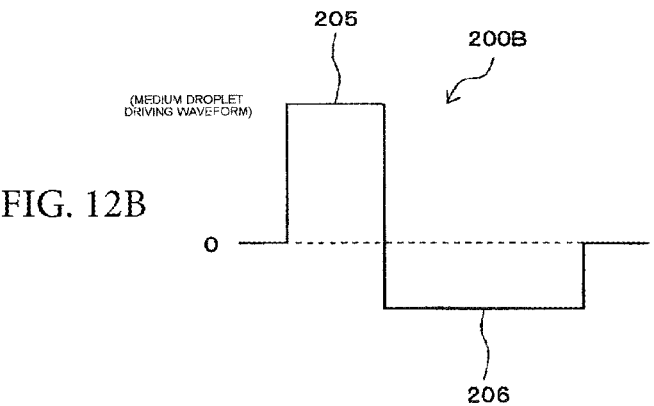

A medium droplet driving voltage 200B shown in FIG. 12B is a driving waveform which has an expansion pulse 205 which expands the capacity of the channel 71 and contracts (restores) the same after a fixed time and a contraction pulse 206 which contracts the capacity of the channel 71 and expands (restores) the same after a fixed time alone in the one-pixel period.

The expansion pulse 205 is a pulse which rises from the reference potential and falls to the reference potential after fixed time. The contraction pulse 206 is a pulse which falls from the reference potential and rises to the reference potential after a fixed time. The expansion pulse 205 and the contraction pulse 206 are continuous without interposing a pause period therebetween.

Although pulse widths of the respective pulses 205 and 206 are not restricted in particular, when the channel 71 and the nozzle N have the same dimensions as those described above, assuming that the pulse width of the expansion pulse 205 is 1 AL and the pulse width of the contraction pulse 206 is 2 AL, a droplet of 4.0 pl is discharged from the nozzle N. A dot diameter of a medium dot formed of this droplet of 4.0 pl is approximately 60 μm on the coated paper sheet.

Figure 13:
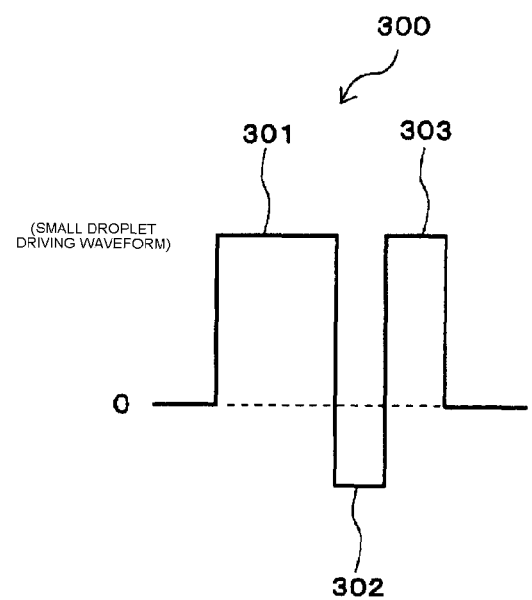
FIG. 13 is a view showing an example of a small droplet driving waveform.
Figure 16A:
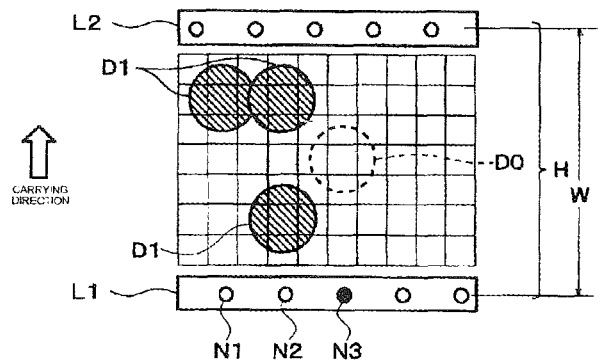
FIG. 16 are enlarged views of a conventional example in which droplets are discharged from respective nozzles except a nozzle having a discharge defect to form an image in a predetermined region on the recording medium.
Figure 16B:
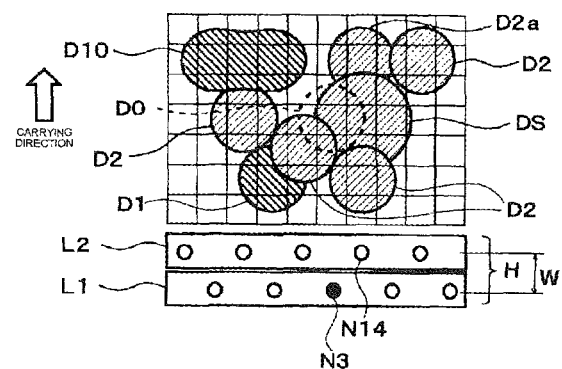
Figure 16C:
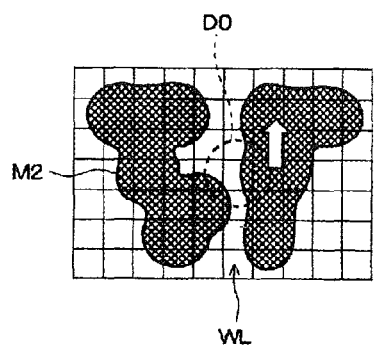

Next, an example of the small droplet driving waveform is shown in FIG. 13.

A small droplet driving waveform 300 is a driving waveform which has a first expansion pulse 301 which expands the capacity of the channel 71 and contracts (restores) the same after a fixed time, a contraction pulse 302 which contracts the capacity of the channel 71 and expands (restores) the same after a fixed time, and a second expansion pulse 303 which expands the capacity of the channel 71 and contracts (restores) the same after a fixed time in the one-pixel period in the mentioned order.

Each of the first expansion pulse 301 and the second expansion pulse 303 is a pulse which rises from the reference potential and falls to the reference potential after a fixed time. The contraction pulse 302 is a pulse which falls from the reference potential and rises to the reference potential after a fixed time. The first expansion pulse 301 and the contraction pulse 302 are continuous and the contraction pulse 302 and the second expansion pulse 303 are continuous without interposing pause periods therebetween, respectively.

Although pulse widths of the respective pulses 301, 302, and 303 are not restricted in particular, when the channel 71 and the nozzle N have the same dimensions as those described above, assuming that a pulse width of the first expansion pulse 301 is 1 AL, a pulse width of the contraction pulse 302 is 0.4 AL, and a pulse width of the second expansion pulse 303 is 0.45 AL, a small droplet of 3.3 pl whose droplet amount is smaller than those in the examples of the medium droplet driving waveforms 200A and 200B is discharged from the nozzle N. A dot diameter of a small dot formed of this droplet of 3.3 pl is approximately 50 μm on the coated paper sheet.

It is to be noted that a method for reducing a droplet amount discharged from the nozzle N is not restricted to a method using a dedicated driving waveform like the small droplet driving waveform 300, and there is also a method for reducing a driving voltage of, e.g., the medium droplet driving waveform 200A or 200B. This adjustment can be performed by outputting a control signal to reduce the driving voltage to the driving circuit 21 by the control unit 4. In this case, since the driving waveform 300 dedicated to small droplets does not have to be prepared, a load of the driving waveform storage unit 21a or the like can be decreased.

When the droplet amount discharged from the nozzle N is reduced, an average speed of the droplet until this droplet impacts the coated paper sheet is lowered. Thus, in case of discharging the small droplet from the nozzle N, it is also preferable to perform adjustment so that an impact position becomes the same as that in case of discharging the medium droplet.

The large droplet driving waveform will now be described with reference to FIG. 14. FIG. 14A shows an example of the large droplet driving waveform, and (b) shows a conceptual view of a droplet discharged with the large droplet driving waveform.

A large droplet driving waveform 400 shown in FIG. 14A is constituted by combining two types of driving waveforms 400a and 400b in the one-pixel period.

The first half driving waveform 400a has a first expansion pulse 401 which expands the capacity of the channel 71 and contracts (restores) the same after a fixed time, a first contraction pulse 402 which contracts the capacity of the channel 71 and expands (restores) the same after a fixed time, a second expansion pulse 403 which expands the capacity of the channel 71 and contracts (restores) the same after a fixed time, a second contraction pulse 404 which contracts the capacity of the channel 71 and expands (restores) the same after a fixed time, and a third contraction pulse 405 which contracts the capacity of the channel 71 and expands (restores) the same after a fixed time in the mentioned order.

Additionally, the second half driving waveform 400b has the same waveform structure as that of the medium droplet driving waveform 200A. That is, it has a third expansion pulse 407 which expands the capacity of the channel 71 and contracts (restores) the same after a fixed time, a fourth contraction pulse 408 which contracts the capacity of the channel 71 and expands (restores) the same after a fixed time, and a fifth contraction pulse 409 which contracts the capacity of the channel 71 and expands (restores) the same after a fixed time in the mentioned order.

The first expansion pulse 401, the second expansion pulse 403, and the third expansion pulse 407 are pulses which rise from the reference potential and fall to the reference potential after a fixed time. The first contraction pulse 402, the second contraction pulse 404, the third contraction pulse 405, the fourth contraction pulse 408, and the fifth contraction pulse 409 are pulses which fall from the reference potential and rise to the reference potential after a fixed time. The first expansion pulse 401 and the first contraction pulse 402 are continuous, the first contraction pulse 402 and the second expansion pulse 403 are continuous, the second expansion pulse 403 and the second contraction pulse 404 are continuous, and the third expansion pulse 407 and the fourth contraction pulse 408 are continuous without interposing a pause period therebetween, respectively. Pause periods 406, 411, and 410 during which the reference potential is maintained for a fixed period are provided between the second contraction pulse 404 and the third contraction pulse 405, between the third contraction pulse 405 and the third expansion pulse 407, and between the fourth contraction pulse 408 and the fifth contraction pulse 409, respectively.

With this large droplet driving waveform 400, as shown in FIG. 14B, a first droplet DR1 is discharged from the nozzle N by the first expansion pulse 401 and the first contraction pulse 402 in the first half driving waveform 400a, and a second droplet DR2 larger than the first droplet DR1 is discharged from the same nozzle N by the subsequent second expansion pulse 403 and first contraction pulse 404. Comparing the first droplet DR1 and the second droplet DR2, the first droplet DR1 has a relatively slow droplet speed. Thus, the first and second droplets DR1 and DR2 are combined during flying immediately after the discharge.

After the discharge of these first and second droplets DR1 and DR2, as shown in FIG. 14B, another third droplet DR3 is subsequently discharged with the use of the second half driving waveform 400b. This third droplet DR3 is a droplet having a higher droplet speed than that of a droplet which is a combination of the precedently discharged first and second droplets DR1 and DR2, and it is combined during flying, or impacts substantially the same position on the recording medium P and is combined. As a result, a large dot formed of a large droplet DR having a sufficiently large droplet amount can be formed on the recording medium P.

According to this large droplet driving waveform 400, a relatively large droplet can be formed by using the first half driving waveform 400a alone, this resultant large droplet DR is constituted of the first droplet DR1 having the relatively low droplet speed and the second droplet DR2 having the relatively high droplet speed, and formed when the third droplet DR3 is further combined with these droplets, and hence its droplet speed is lower than that in case of discharging one droplet having the same droplet amount as that of this droplet, which enables suppressing a satellite amount.

In general, a satellite is produced when a tail formed to extend rearward with a discharged main droplet is separated from the main droplet. Since both the satellite and the main droplet impact substantially the same positions as long as the satellite is separated from the main droplet at a close position, they hardly affect image quality. However, when the satellite is separated at a position distant from the main droplet, an impact position is likewise greatly apart from the main droplet, thus deteriorating the image quality. As the droplet speed increases, the tail becomes longer, and the satellite is apt to be separated at a position distant from the main droplet. According to the large droplet driving waveform 400 configured to discharge this large droplet DR, since a relatively large droplet amount can be discharged at a low speed, a length of the tail accompanying the droplet can be shortened, and an influence of the satellite can be suppressed.

Although widths of the respective pulses 401 to 405 and 407 to 409 and the pause periods 406 and 410 in the large droplet driving waveform 400 are not restricted in particular, when the channel 71 and the nozzle N have the same dimensions as those described above, assuming that a pulse width of the first expansion pulse 401 in the first half is 0.8 AL, a pulse width of the first contraction pulse 402 in the same is 0.4 AL, a pulse width of the second expansion pulse 403 in the same is 1 AL, a pulse width of the second contraction pulse 404 in the same is 0.5 AL, a pulse width of the third contraction pulse 405 in the same is 1 AL, a width of the pause period 406 in the same is 0.5 AL, a width of the pause period 411 in the same is 1.3 AL, the respective pulses 407 to 409 and the pause period 410 in the second half are the same as counterparts in the medium droplet driving waveform 200A, and the third expansion pulse 407 rises after elapse of 5.5 AL from rising of the first expansion pulse 401, a large droplet of 9.2 pl having a sufficiently larger droplet amount than those of the medium droplet driving waveforms 200A and 200B can be discharged from the nozzle N. A dot diameter of a large dot formed of this droplet of 9.2 pl is approximately 70 μm on the coated paper sheet.

These respective driving waveforms or pulse widths are just examples, and the present invention is not restricted thereto. The large droplet driving waveform could include a driving waveform which has a first expansion pulse which expands the capacity of the channel 71 and restores the same after a fixed time, a first contraction pulse which contracts the capacity of the channel 71 and restores the same after a fixed time, a second expansion pulse which expands the capacity of the channel 71 and restores the same after a fixed time, and a second contraction pulse which contracts the capacity of the channel 71 and restores the same after a fixed time in the mentioned order. The respective driving waveforms used in the image formation and the interpolation setting can be appropriately changed depending on a specific structure of the droplet discharge unit 22, a type of a liquid used, and the like. For example, a droplet amount of the small droplet can be increased or decreased by appropriately adjusting the pulse width of the first expansion pulse 301 in the small droplet driving waveform 300. Thus, in case of discharging the small droplet with the use of this small droplet driving waveform 300, it is preferable for the control unit 4 to adjust the pulse width of the first expansion pulse 301, thereby enabling changing the droplet amount of the small droplet. It is to be noted that the expansion pulse is not restricted to the pulse which expands the capacity of the channel 71 and then restores the same after a fixed time, and it may be a pulse which contracts the capacity after a fixed time. Further, contraction pulse is not restricted to the pulse which expands the capacity of the channel 71 and then restores the same after a fixed time, and it may be a pulse which expands the capacity after a fixed time.

Furthermore, it is also preferable to adjust the first expansion pulse 401 in the large droplet driving waveform 400 to be 0.5 AL or more and 3.5 AL or less. Consequently, the large droplet can be efficiently discharged. In case of discharging the large droplet with the use of this large droplet driving waveform 400, it is also preferable for the control unit 4 to adjust the pulse width of the first expansion pulse 401, thereby enabling changing the droplet amount of the large droplet. For example, when the pulse is appropriately adjusted to fall within the range of 0.5 AL to 3.5 AL as described above, the large droplet having the appropriately adjusted droplet amount can be efficiently discharged.

It is preferable for each driving waveform to be a rectangular wave. Since the rectangular wave can be easily generated by using a simple digital circuit, a circuit configuration can be simplified as compared with an example using a trapezoidal wave having a sloping wave. Moreover, since the shear-mode type inkjet head 2 shown in this embodiment can generate the pressure waves in phase relative to the application of the driving waveform constituted of the rectangular wave, the droplets can be efficiently discharged, and a driving voltage can be suppressed. In general, since a voltage is constantly applied to the inkjet head 2 irrespective of discharge and non-discharge, a low driving voltage is important for suppression of heat generation in the inkjet head 2 and stable discharge of the droplets.

It is to be noted that the rectangular wave means a waveform such that both a rising time and a falling time between 10% and 90% of a voltage are within ½ or preferably ¼ of AL when the reference voltage is 0% and the peak value voltage is 100%.

Although the structure in which the partition wall 72 between the channels 71 and 71 adjacent to each other undergoes the shear deformation has been described above as the example of the droplet discharge unit 22 of the shear-mode type inkjet head 2, but the present invention is not restricted thereto. For example, the upper wall or the lower wall of the channel may be constituted of a piezoelectric element such as PZT so that the upper wall or the lower wall undergoes the shear deformation.

Besides, the inkjet head according to the present invention is not restricted to the shear-mode type at all. For example, it may be an inkjet head having a structure that one wall surface of a pressure chamber is formed of a vibration plate and this vibration plate is vibrated by the piezoelectric element such as PZT to apply a discharge pressure to a liquid in the pressure chamber. Additionally, it may be an inkjet head having a structure that a heat generating element is provided in a pressure chamber and a rupture function of air bubbles generated when a liquid in the pressure chamber is heated is used to discharge droplets.

As described above, according to the present invention, it is possible to provide the inkjet recording apparatus which can suppress the liquid gathering of the interpolation dot to interpolate the discharge defective nozzle and can avoid deterioration of image quality. Further, according to the present invention, it is possible to provide the method for driving an inkjet head which can suppress the liquid gathering of the interpolation dot which interpolates the discharge defective nozzle and can avoid deterioration of image quality. Furthermore, according to the present invention, it is possible to provide the method for forming an image which can suppress the liquid gathering of the interpolation dot which interpolates the discharge defective nozzle and can avoid deterioration of image quality.

EXPLANATION OF LETTERS AND NUMERALS

- 100: inkjet recording apparatus
- 1: carrying unit
  - 11: carrying belt
  - 12: carrying roller
  - 13: carrying motor
- 2: inkjet head
  - 21: driving circuit
  - 21a: driving waveform storage unit
  - 22: droplet discharge unit
- 3: image reading unit
  - 31: image sensor
- 4: control unit
  - 41: discharge defect inspection unit
  - 42: discharge defective nozzle identification unit
  - 42a: nozzle position storage unit
  - 43: interpolation setting unit
- 5: operation display unit
- 6: communication unit
- 70: channel substrate
- 71: channel
- 72: partition wall
  - 72a: upper wall portion
  - 72b: lower wall portion
- 73: cover substrate
- 74: nozzle plate
- 75: common flow path
- 76: driving electrode
- 200A, 200B: medium droplet driving waveform
  - 201: expansion pulse
  - 202: first contraction pulse
  - 203: second contraction pulse
  - 204: pausing period
  - 205: expansion pulse
  - 206: contraction pulse
- 300: small droplet driving waveform
  - 301: first expansion pulse
  - 302: contraction pulse
  - 303: second expansion pulse
- 400: large droplet driving waveform
  - 400a: first half driving waveform
  - 400b: second half driving waveform
  - 401: first expansion pulse
  - 402: first contraction pulse
  - 403: second expansion pulse
  - 404: second contraction pulse
  - 405: third contraction pulse
  - 406: pausing period
  - 407: third expansion pulse
  - 408: fourth contraction pulse
  - 409: fifth contraction pulse
  - 410: pause period
- D0: dot which is supposed to be formed by a discharge defective nozzle
- D1, D2: dot
- DS: interpolation dot
- D2a to D2d: adjacent dot
- DR: large droplet
  - DR1: first droplet
  - DR2: second droplet
  - DR3: third droplet
- H: head module
- L1, L2: nozzle row
- M1, M2, M3: image
- N: nozzle
- P: recording medium
  - P1: image forming region
  - P2: margin region
- T: test image
- X1, X2: overlapping portion

The invention claimed is:

1. An inkjet recording apparatus comprising:
an inkjet head configured to separately discharge a large droplet, a medium droplet, and a small droplet from each of a plurality of nozzles; and
a control unit which forms an image in a single-pass system by discharging the medium droplets from the plurality of nozzles respectively, and forms an interpolation dot to interpolate a discharge defective nozzle by discharging a droplet from a first nozzle different from the discharge defective nozzle when the discharge defective nozzle is present,
wherein the control unit forms the interpolation dot to interpolate the discharge defective nozzle with the use of the large droplet discharged from the first nozzle different from the discharge defective nozzle, and forms at least one adjacent dot which is in contact with the interpolation dot in a partially overlapping manner with the use of the small droplet, the small droplet being discharged from a second nozzle of the plurality of nozzles, the second nozzle different from the discharge defective nozzle and different from the first nozzle, and
wherein the discharge defective nozzle is disposed between the first nozzle and the second nozzle, and
wherein the discharge defective nozzle does not eject a droplet.

2. The inkjet recording apparatus according to claim 1,
wherein the adjacent dot is a dot which is in contact with the interpolation dot on a side away from a dot which is supposed to be formed by the discharge defective nozzle on a recording medium.

3. The inkjet recording apparatus according to claim 1,
wherein a dot diameter of the interpolation dot formed of the large droplet on a recording medium is 115% to 250% of a dot diameter formed by the medium droplet.

4. The inkjet recording apparatus according to claim 1,
wherein a dot diameter of a dot formed of the small droplet on a recording medium is 50% to 85% of the dot diameter formed by the medium droplet.

5. An inkjet recording apparatus according to claim 1,
wherein the inkjet head comprises a pressure chamber communicating with the nozzles, and a pressure generator which expands or contracts a capacity of the pressure chamber by applying a driving waveform to give a discharge pressure to a liquid in the pressure chamber, and
the driving waveform to discharge the large droplet comprises a first expansion pulse which expands the capacity of the pressure chamber and contracts the same after a fixed time, a first contraction pulse which contracts the capacity of the pressure chamber and expands the same after a fixed time, a second expansion pulse which expands the capacity of the pressure chamber and contracts the same after a fixed time, and a second contraction pulse which contracts the capacity of the pressure chamber and expands the same after a fixed time in the mentioned order.

6. The inkjet recording apparatus according to claim 5,
wherein, assuming that ½ of an acoustic resonance period of a pressure wave in the pressure chamber is AL, a pulse width of the first expansion pulse is 0.5 AL or more and 3.5 AL or less.

7. The inkjet recording apparatus according to claim 5,
wherein the control unit is configured to change a droplet amount of the large droplet by adjusting the pulse width of the first expansion pulse.

8. The inkjet recording apparatus according to claim 1,
wherein the control unit enables discharging the small droplet by lowering and using a driving voltage of a medium droplet driving waveform to discharge the medium droplet.

9. A method for driving an inkjet head, comprising:
forming an image in a single-pass system on a recording medium by discharging medium droplets from each of a plurality of nozzles configured to separately discharge a large droplet, the medium droplet, and a small droplet; and forming an interpolation dot to interpolate a discharge defective nozzle by discharging a droplet from a first nozzle different from the discharge defective nozzle when the discharge defective nozzle is present,
wherein the large droplet is discharged from the first nozzle different from the discharge defective nozzle at the time of forming the interpolation dot, and the small droplet is discharged at the time of forming at least one adjacent dot which is in contact with the interpolation dot in a partially overlapping manner, the small droplet being discharged from the first a second nozzle of the plurality of nozzles, the second nozzle different from the discharge defective nozzle and different from the first nozzle, and
wherein the discharge defective nozzle is disposed between the first nozzle and the second nozzle, and wherein the discharge defective nozzle does not eject a droplet.

10. The method for driving an inkjet head according to claim 9,
wherein the adjacent dot is a dot which is in contact with the interpolation dot on a side away from a dot which is supposed to be formed by the discharge defective nozzle on the recording medium.

11. The method for driving an inkjet head according to claim 9,
wherein a dot diameter of a dot formed of the large droplet on the recording medium is 115% to 250% of a dot diameter formed by the medium droplet.

12. The method for driving an inkjet head according to claim 9, wherein a dot diameter of a dot formed of the small droplet on the recording medium is 50% to 85% of the dot diameter formed by the medium droplet.

13. The method for driving an inkjet head according to claim 9, wherein the inkjet head comprises a pressure chamber communicating with the nozzles, and a pressure generator which expands or contracts a capacity of the pressure chamber by applying a driving waveform to give a discharge pressure to a liquid in the pressure chamber, and
the driving waveform to discharge the large droplet comprises a first expansion pulse which expands the capacity of the pressure chamber and contracts the same after a fixed time, a first contraction pulse which contracts the capacity of the pressure chamber and expands the same after a fixed time, a second expansion pulse which expands the capacity of the pressure chamber and contracts the same after a fixed time, and a second contraction pulse which contracts the capacity of the pressure chamber and expands the same after a fixed time in the mentioned order.

14. The method for driving an inkjet head according to claim 13,
wherein, assuming that ½ of an acoustic resonance period of a pressure wave in the pressure chamber is AL, a pulse width of the first expansion pulse is 0.5 AL or more and 3.5 AL or less.

15. The method for driving an inkjet head according to claim 13,
wherein a droplet amount of the large droplet is changed by adjusting the pulse width of the first expansion pulse.

16. The method for driving an inkjet head according to claim 9, wherein the small droplet is discharged by lowering and using a driving voltage of a medium droplet driving waveform to discharge the medium droplet.

17. The inkjet recording apparatus according to claim 1, wherein the control unit forms the adjacent dot using the small droplet so that it partially overlaps the interpolation dot.

18. The inkjet recording apparatus according to claim 1, wherein the adjacent dot is a dot formed earlier than the interpolation dot on a recording medium.

19. The inkjet recording apparatus according to claim 1, wherein the control unit is configured to form a plurality of adjacent dots, which are in contact with the interpolation dot in a partially overlapping manner, by using the small droplets.

20. The inkjet recording apparatus according to claim 1, wherein the control unit forms the adjacent dot using the small droplet in a size which covers one entire pixel on a recording medium.

21. The inkjet recording apparatus according to claim 1, wherein the nozzle other than the discharge defective nozzle is the first nozzle.

22. The method according to claim 9, wherein the nozzle other than the discharge defective nozzle is the first nozzle.

* * * * *